United States Patent [19]

Murray et al.

[11] Patent Number: 5,148,848
[45] Date of Patent: Sep. 22, 1992

[54] LIFT ASSIST MECHANISM FOR RETRACTABLE AWNING

[75] Inventors: Brent W. Murray, Longmont; Thomas G. Faludy, Westminster, both of Colo.

[73] Assignee: Carefree/Scott Fetzer Company, Broomfield, Colo.

[21] Appl. No.: 826,899

[22] Filed: Jan. 28, 1992

[51] Int. Cl.⁵ .............................................. E04F 10/06
[52] U.S. Cl. ......................................... 160/67; 160/66; 160/71
[58] Field of Search .................. 160/67, 66, 68, 71, 160/74

[56] References Cited

U.S. PATENT DOCUMENTS

| | | |
|---|---|---|
| 4,160,458 | 7/1979 | Marcellus . |
| 4,373,707 | 2/1983 | Mölders . |
| 4,623,132 | 11/1986 | Smith . |
| 4,836,263 | 6/1989 | Ament . |
| 4,909,488 | 3/1990 | Seibert et al. . |

FOREIGN PATENT DOCUMENTS

| | | | |
|---|---|---|---|
| 2736721 | 2/1978 | Fed. Rep. of Germany | 160/68 |
| 694619 | 10/1965 | Italy | 160/68 |
| 7703999 | 10/1978 | Netherlands | 160/67 |
| 2050154 | 1/1981 | United Kingdom . | |

Primary Examiner—Blair M. Johnson
Attorney, Agent, or Firm—Gary M. Polumbus

[57] ABSTRACT

A mechanism is disclosed for assisting an operator of a retractable awning in lifting the awning to a desired elevation. The mechanism includes a pair of back-to-back gas spring units which are operatively connected to relatively sliding telescoping members of a support arm for the awning to bias the support arm outwardly in a direction to assist in lifting the awning into a desired orientation. In one embodiment of the mechanism, a compression spring is provided in axial alignment with the gas spring units to provide an elongated stroke for additional assistance in attaining abnormal elevation of the awning.

6 Claims, 3 Drawing Sheets

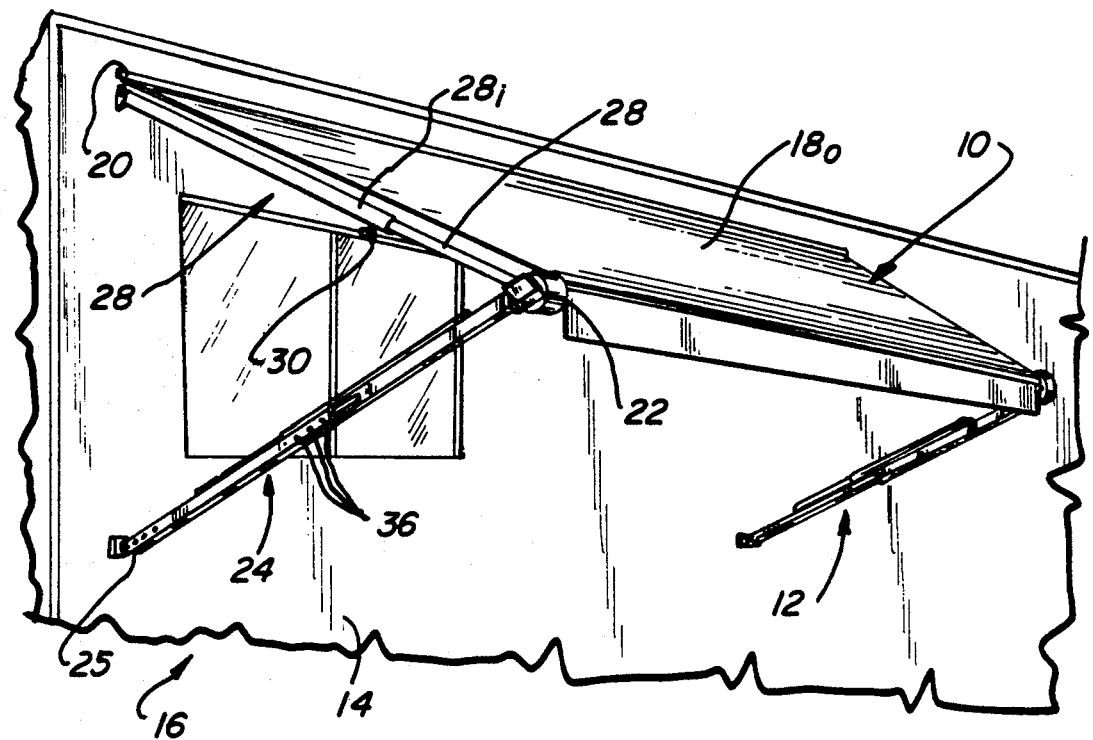
Fig_1
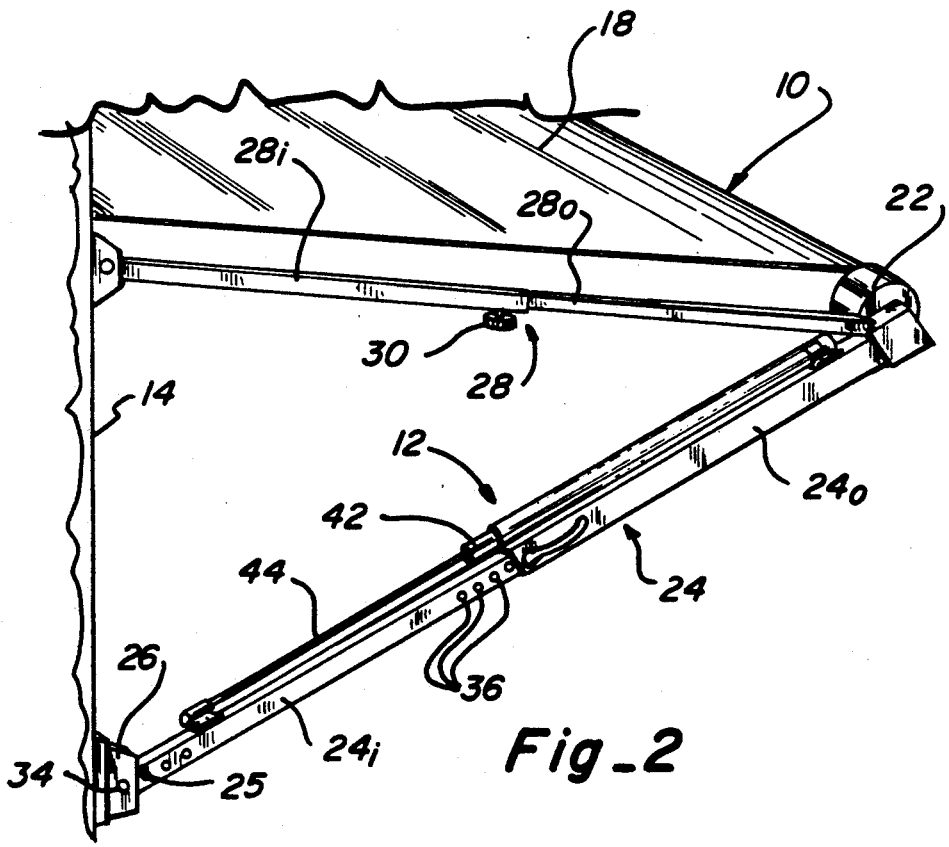
Fig_2

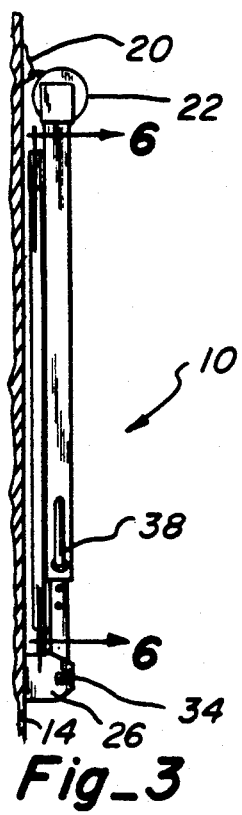
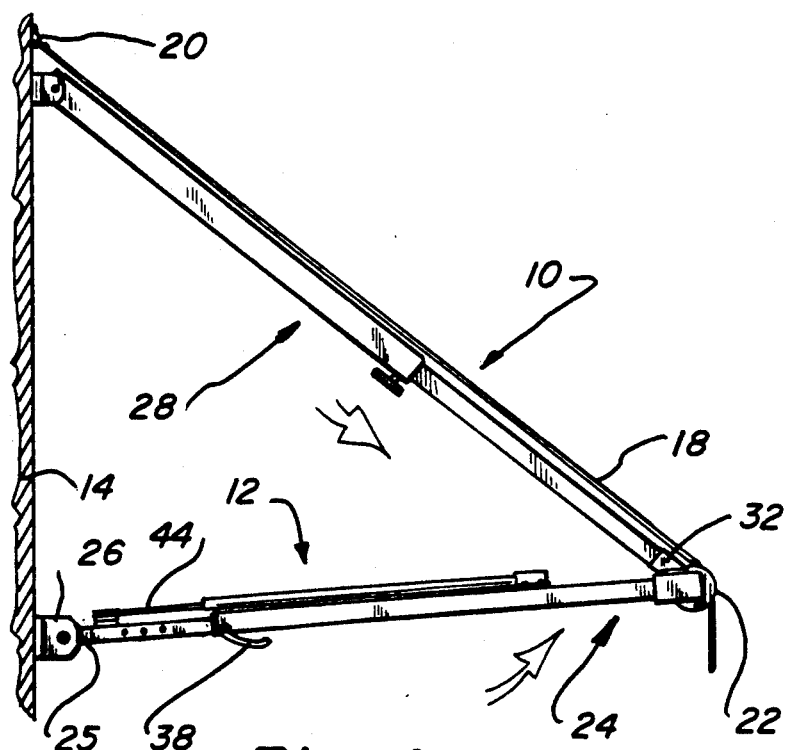
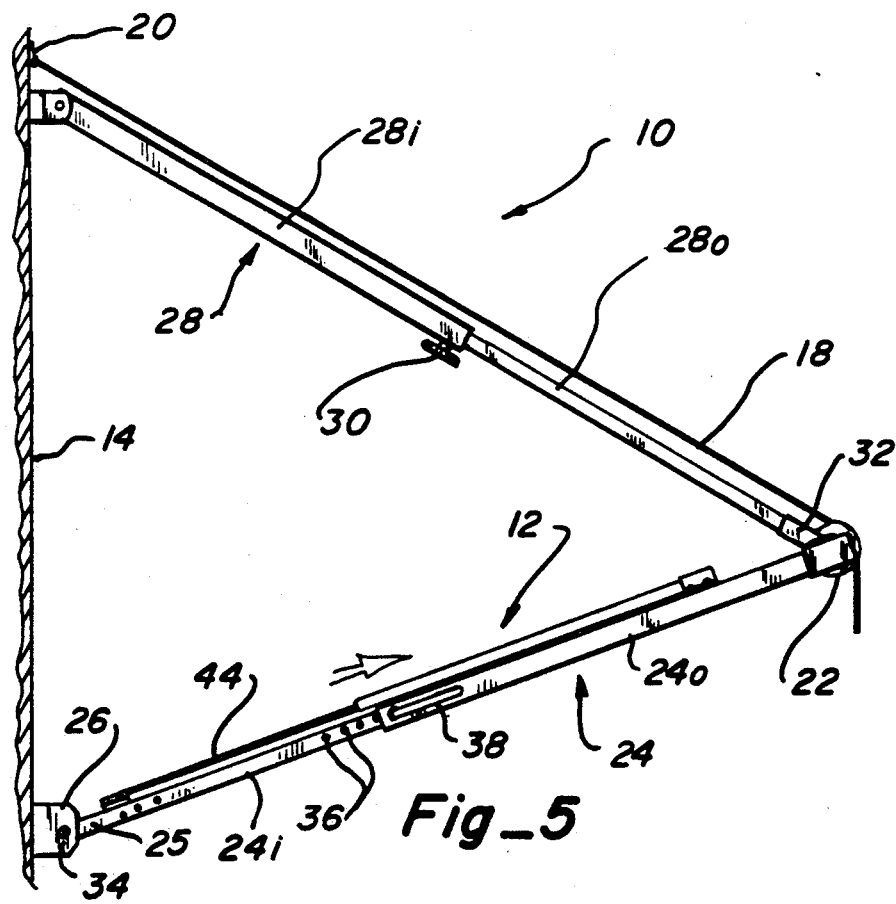

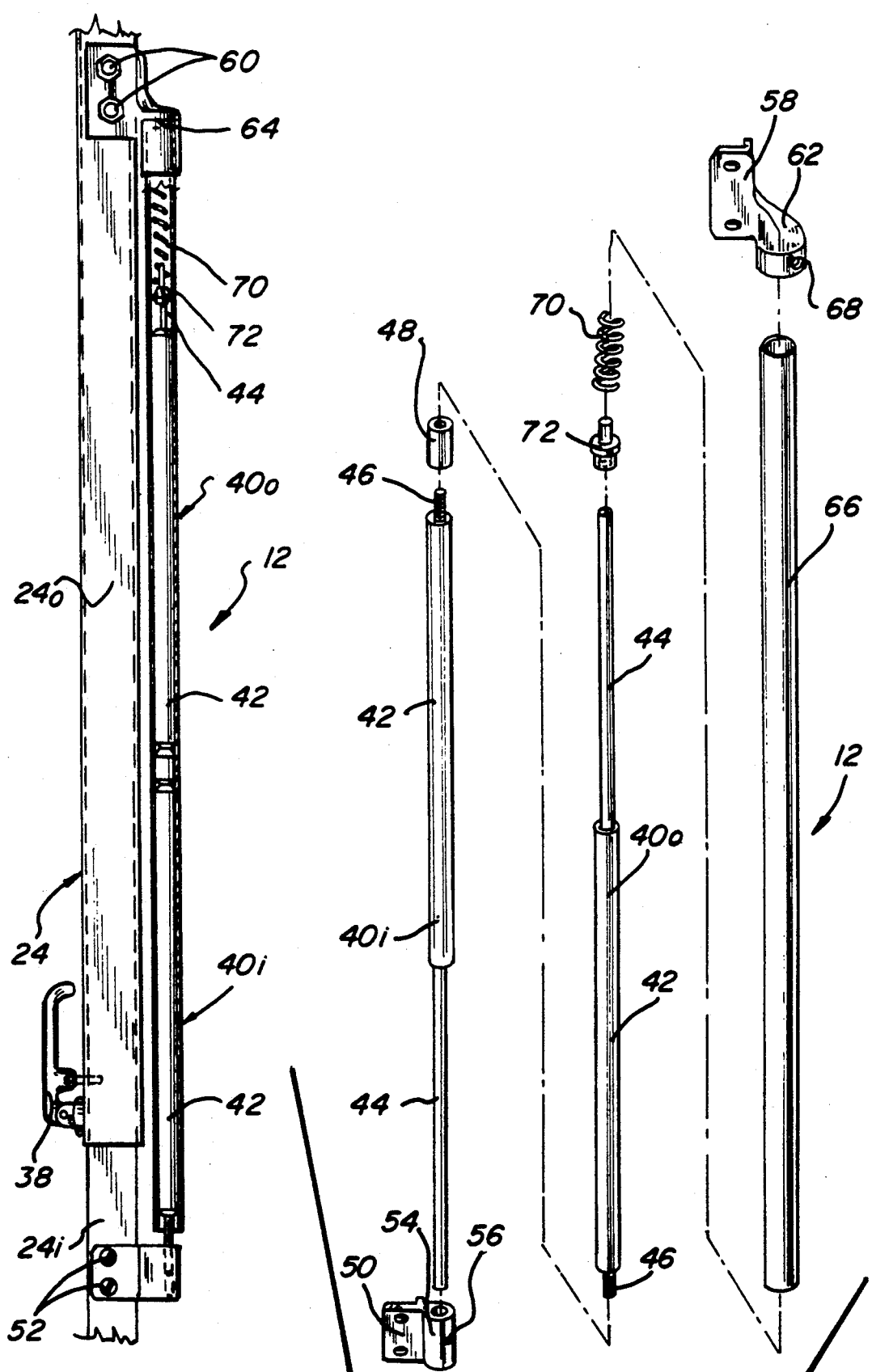
Fig_6
Fig_7

LIFT ASSIST MECHANISM FOR RETRACTABLE AWNING

BACKGROUND OF THE INVENTION

1. Field of the Invention

The present invention relates generally to retractable awnings and more particularly to a mechanism that facilitates the extension of such an awning.

2. Description of the Prior Art

Retractable awnings have been in use for many years with early uses being primarily as covers for windows, doors and the like. More recently, retractable awnings have been designed for use on mobile structures such as recreational vehicles and mobile homes, and accordingly, out of necessity, the awnings have needed to include more sophisticated systems of operation and for retaining the awnings in either retracted or extended positions. Further, awnings for recreational vehicles and mobile homes are fairly long so as to extend along a substantial portion of the side of the vehicle, and accordingly, they are relatively heavy and are sometimes difficult to manipulate.

Typically, a retractable awning includes an awning sheet that is secured along one edge to the side of the recreational vehicle or the like with the opposite edge being secured to a roll bar about which the awning sheet can be wrapped. The roll bar is rotatably supported at opposite ends by support arms which are typically telescoping in nature and have an inner end affixed to the side wall of the vehicle at a location beneath the connection of the awning sheet to the vehicle. Rafters are also normally provided which extend from the roll bar to a location on the side of the vehicle adjacent to the connection of the awning sheet to the vehicle with the rafters typically being used to retain the awning sheet in a taut condition. The awning is moved from a retracted position adjacent to the side of the vehicle to an extended position by allowing the support arms to pivot about their connection to the side of the vehicle thereby allowing the awning sheet to unroll from the roll bar. After the awning sheet has been fully extended, the rafters are locked in position to retain a taut condition of the awning sheet, and subsequently, the support arms are telescopically extended causing the roll bar to move upwardly to a desired elevation.

The extension of the support arms has traditionally been difficult due to the heavy weight of the awning structure which is being lifted as the support arms are extended. The problem is compounded by the fact that many recreational vehicles are owned and operated by elderly individuals who do not always have the strength of younger individuals, and many times the elderly have some difficulty in extending the awnings to a desired elevation.

It is to overcome the difficulties in deployment or extension of prior art retractable awnings that the present invention has been developed.

SUMMARY OF THE INVENTION

The lift assist mechanism of the present invention includes a pair of interconnected back-to-back gas springs which operably interconnect the telescoping components of at least one support arm of a retractable awning to facilitate the telescopic extension of the support arm in lifting the awning to a desired orientation.

The support arms for the awning are pivotally connected at one end to a support surface on a building structure, mobile home, recreational vehicle or the like. At the opposite end the support arms rotatably support the roll bar for the awning. The awning conventionally includes an awning sheet having one edge secured to the support surface and an opposite edge secured to the roll bar so that the awning sheet can be rolled about the roll bar when the awning is moved from an extended position to a retracted position adjacent to the support surface.

Rafter arms are typically connected to the support surface adjacent to the connection of the awning sheet and are also operably connected to the roll bar so as to be capable of retaining a desired fixed spacing between the support surface and the roll bar to retain the awning sheet in a taut condition. However, as will be appreciated from the detailed description that follows, the length of the support arms determine the elevation of the roll bar relative to the ground, and the support arms have to be telescopically extended to elevate the roll bar to a desired elevation.

The lift assist mechanism applies a substantially constant biasing force toward extending the associated support arm and thus elevating the roll bar. The substantially constant pressure or force applied by the lift assist mechanism is slightly less than enough to overcome the weight of the awning, and, accordingly, will not lift the roll bar on its own accord, but provides significant assistance to an operator in lifting the roll bar. Therefore, the lift assist mechanism provides a desired level of assistance which enables any individual to easily place the awning in an elevated orientation.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a fragmentary isometric view of a recreational vehicle having a retractable awning incorporating the lift assist mechanism of the present invention in an extended condition.

FIG. 2 is a fragmentary isometric view of one end of the awning as illustrated in FIG. 1.

FIG. 3 is a fragmentary vertical section through the vehicle illustrating the awning in a retracted condition.

FIG. 4 is a fragmentary side elevation illustrating the awning in a partially extended condition prior to extension support arms.

FIG. 5 a fragmentary vertical section similar to FIG. 4 with awning in a fully extended condition.

FIG. 6 is a enlarged section taken along line 6—6 of FIG. 3.

FIG. 7 is an exploded isometric view of the lift assist mechanism including the brackets for mounting the mechanism on a support arm.

DESCRIPTION OF THE PREFERRED EMBODIMENT

A retractable awning 10 incorporating the lift assist mechanism 12 of the present invention is shown in FIG. 1 mounted on a side wall 14 of a recreational vehicle 16. The awning includes a rectangular awning sheet 18 having an inner edge secured to the side wall 14 by an awning rail 20 and having its opposite or outer edge secured to a roll bar 22 about which the awning sheet is wrapped when the awning is in a retracted condition as illustrated in FIG. 3. The roll bar 22 is rotatably mounted at its opposite ends on the outer ends of support arms 24 which have their inner ends 25 pivotally connected to the side wall of the vehicle by mounting brackets 26. A pair of rafter arms 28 extend between the side wall 14, at a location adjacent to the awning rail 20, and the roll bar and are extensible in length so as to selectively retain the awning sheet 18 in a taut condition when the awning is extended.

It will be appreciated from the above that the awning 10 is movable between the extended condition of FIG. 1 and the retracted condition of FIG. 3 by allowing the rafter arms 28 to retract while pivoting the support arms 24 upwardly about their connection to the side wall 14. In the retracted condition, the awning sheet 18 is fully wrapped around the roll bar with the support arms 24 and rafter arms 28 disposed in vertical parallel alignment with the side wall 14. The roll bar 22 is torsionally biased in a conventional manner by internal coil springs (not seen) sc that, as the awning is moved from an extended position to a retracted position, the roll bar automatically rotates to wrap the awning sheet therearound.

The rafter arms 28 include a relatively large cross section inner member 28i and a relatively small cross section outer member 28o which are relative to each other. A thumb screw 30 threadedly passes through the larger member 28i so as to be engageable with the smaller member 28o to selectively lock the inner and outer members at desired longitudinally related positions. Obviously, when the awning is moved between its extended and retracted positions, the thumb screw 30 is loosened so that the inner and outer members are allowed to slide longitudinally relative to each other. In order to retain the awning sheet in a taut condition, however, the awning sheet is fully extended and the inner and outer rafter members are locked longitudinally relative to each other to provide a brace between the side wall 14 of the vehicle and the roll bar 22 to retain the awning sheet in a taut condition. The rafters may have their outer ends 32 slidably related to an associated support arm 24 so that, as the awning is retracted, the outer ends 32 of the rafters slide inwardly along the associated support arms until the outer ends of the rafters are disposed adjacent to the inner ends 25 of the associated support arms and the support arms and rafters arms are vertically oriented as illustrated in FIG. 3.

The support arms 24 also include inner and outer telescoping members 24i and 24o, respectively, with each member being of substantially U-shaped cross-section. The inner member 24i is of smaller dimension than the outer member 24o and slides longitudinally relative thereto. The inner end 25 of each support arm is pivotally connected to the associated mounting bracket 26 with a pivot pin 34 so as to allow the support arm 24 to pivotally move between a vertical retracted position and a somewhat horizontal extended position. A plurality of longitudinally aligned holes 36 are provided in the side of the inner member 24i and are adapted to conventionally cooperate with a spring-biased lock handle 38 on the outer telescoping member 24o so that relative longitudinal positions between the inner and outer telescoping members can be selectively fixed. The overall length of the support arms can be adjusted by releasing the handles 38 and allowing the inner and outer members to slide relative to each other before subsequently locking the handle into one of the aligned holes 36 provided in the inner member.

The lift assist mechanism 12 of the present invention, while being shown in FIGS. 1 through 5 associated with each of the support arms 24 of the awning, is probably best seen in FIGS. 6 and 7. The mechanism 12 could be mounted on one or both of the support arms and is adapted to bias the associated outer member 24o of the support arm outwardly to extend the overall length of the support arm.

The lift assist mechanism 12 includes identical inner and outer gas springs 40i and 40o, respectively, each of which includes a cylinder 42, a piston slidably disposed in the cylinder (not seen) and a piston rod 44 connected to the piston and reciprocally protruding through one end of the cylinder 42 in a sealed manner. The gas springs are conventional items and may be of the type manufactured by Stabilus of Colnar, Pa., and sold under Model No. 860956. They are substantially constant pressure devices which bias the piston rod 44 outwardly under a substantially constant pressure which may vary slightly along a full stroke between 30 and 36 psi.

The opposite end of the cylinder 42 from that through which the piston rod protects has an integral axially directed threaded shaft extension 46 which is adapted to be threadedly received in one end of an internally threaded connector 48. The internally threaded connector opens axially through each end sc that the two gas spring units can be threadedly secured to the connector 48 in back-to-back relationship with the piston rods 44 projecting in opposite directions.

An inner bracket or abutment 50 is secured to the inner member 24i of the associated support arm 24 by suitable screw-type fasteners 52 and has a lateral projection in the form of a hollow cylinder 54 axially aligned with the gas springs. The free end of the piston rod 44 associated with the inner gas spring 40i is received in the hollow cylinder 54, and a set screw 56 in the hollow cylinder is adapted to be advanced against the piston rod to selectively secure the piston rod to the inner bracket 50.

An outer bracket or abutment 58 is secured to the outer member 24o of the support arm 24 by suitable threaded fasteners 60 and has a laterally projecting cylindrical seat 62 formed thereon. The cylindrical seat has an outer closed end 64 and opens inwardly toward the inner bracket 50 so as to define a cylindrical recess in which the outer end of a cylindrical tubular housing 66 is seated. The housing 66 is fixed in the cylindrical seat 62 by a set screw 68 which is adapted to be advanced against the side of the housing to secure the housing to the outer bracket 58.

The housing 66 is of a length to extend inwardly from the outer bracket 58 and encapsulate the cylinders 42 of both gas springs. The housing terminates a short distance from the inner bracket 50 when the support arms 24 are entirely retracted as illustrated in FIGS. 3 and 6. The housing therefore serves as a guide to retain the gas springs in axially aligned relationship adjacent to the inner and outer members 24i and 24o of the associated support arm.

As is best illustrated in FIG. 6, when the support arms 24 are in their retracted position, a space exists within the housing 66 between the closed end 64 of the outer bracket 58 and the free end of the piston rod 44 of outer gas spring 40o. This space is filled with a compression spring 70 of predetermined compressive force which force is less than the substantially constant force of the gas springs for a reason to be explained later. The compression spring 70 is retained in alignment with the piston rod 44 of the outer gas spring by its confinement within the cylindrical housing 66 and by an axial extension plug 72 retained on the free end of the piston rod 44 of the outer gas spring 40o in a conventional manner. The purpose for the compression spring will become more clear with an explanation of the operation of the lift assist mechanism.

The operation of the awning 10 and the lift assist mechanism 12 of the present invention is probably best illustrated in FIGS. 3 through 5. FIG. 3 illustrates the awning in a retracted position with the support arms 24 extending vertically and the roll bar 22 having the awning sheet 18 wrapped therearound disposed adjacent to the side wall 14 of the vehicle 16 on the top or outer end of the support arms. All retractable awnings of the type described herein have some means for retaining the awning in the retracted position, but a detailed description thereof is not deemed necessary to an understanding of the present invention. Once the means for securing the awning in the retracted position has been released, the roll bar 22 will fall outwardly along an arc so as to unwrap the awning sheet. When the awning sheet has been fully unwrapped, the awning is in the position illustrated in FIG. 4 with the support arms 24 substantially horizontally disposed but not fully extended. As mentioned previously, as the awning sheet is unrolled, the rafter arms 28 are free to extend and become deployed beneath the awning sheet in substantially parallel relationship therewith. The rafter arms thereby bridge the space between the roll bar and the side wall 14 of the vehicle. The awning sheet is then stretched by pulling down on the roll bar and the inner and outer members 28i and 28o of the rafters are locked in a fixed longitudinal relationship by tightening the thumb screw 30 to hold the awning sheet in a taut condition.

As will be appreciated, since the mounting brackets 26 on the side wall 14 of the vehicle for the inner end 25 of the support arms 24 are relatively low on the side wall, and the support arms project substantially horizontally away from the side wall when the awning sheet is first stretched and the rafter arms are fixed, the roll bar 22 itself is at an undesirably low elevation. Accordingly, to lift the roll bar to an elevation such that people can easily pass therebeneath, the support arms 24 are extended, thereby causing the roll bar to elevate by pivoting about the connection of the rafter arms 28 to the side wall 14 of the vehicle. This is best illustrated in FIG. 5, and as will be appreciated, as the elevation of the roll bar is increased, the angle which the support arms 24 make with the side wall of the vehicle is decreased.

In order to extend the support arms 24, the lock handle 38 on each support arm is released from its connection with the inner telescoping member 24i thereby allowing longitudinal sliding movement between the inner and outer members 24i and 24o, respectively. The substantially constant force provided by the gas springs is preset to be slightly less than is required to lift the roll bar 22 so that upon release of the lock handle 38 to allow relative sliding movement between the inner and outer members of the support arm 24, it requires very little outside force by the operator of the awning to lift the roll bar to a desired elevation. In other words, when the inner and outer members 24i and 24o, respectively, of a support arm are free to slide relative to each other, the pressure in the gas springs 40i and 40o, which is biasing the associated piston rods 44 outwardly to lengthen the effective length of the support arm, provides most of the force necessary to extend the associated support arm to a desired length.

Most owners of recreational vehicles having retractable awnings of the type described herein typically like the roll bar 22 to be at an elevation between 6 feet and 6½ feet above the ground.

Accordingly, the combined stroke of the gas springs has been designed such that, when the awning 10 is fully retracted as shown in FIG. 6 and the gas springs are also fully retracted, the compression spring 70 is partially compressed. As the awning is lifted from the position of FIG. 4 to the position of FIG. 5, the gas springs extend so that the piston rods 44 are fully extended when the roll bar 22 attains an elevation of approximately 6 feet. At that point in time, to further assist in lifting the bar to approximately 6½ feet, the compression spring 70 expands due to the fact that the compressive force of the spring is predesigned to be less than the force of the gas springs but greater than what is needed to assist in lifting the roll bar. When the roll bar finally reaches the uppermost limit of the desired elevation of approximately 6½ feet, the gas springs 40i and 40o are fully extended and the compression spring 70 is only slightly compressed. The length of the support arms 24 can then be fixed by relatching the lock handles 38 which fix the longitudinal relationship of the inner and outer support arm members 24i and 24o, respectively.

To retract the awning, it is simply necessary to release the lock handles 38 so that the inner and outer members 24i and 24o, respectively, of the support arms can slide freely relative to each other and to pull down slightly on the roll bar 22 thereby causing the support arms 24 to shorten in length by compressing first the compression spring 70 and subsequently the gas springs 40i and 40o. Once the awning has reached the position of FIG. 4, the length of the support arms 24 can be fixed with the lock handle 38 so that, upon releasing the rafter arms 28 with the thumb screw 30, the awning can be fully retracted by pivoting the roll bar 22 upwardly about the interconnection of the support arms to the side wall 14 of the vehicle.

In an alternative arrangement of the awning 10 which has not been illustrated, the compression spring 70 is replaced with a non-compressible cylindrical block of plastic or the like so that the lift assist mechanism 12 is only operative on moving the roll bar 22 to an elevation of approximately 6 feet. In other words, by placing a noncompressive block within the housing 66 between the free end of the outer gas spring piston rod 44 and the upper bracket $s, the effective distance from the free end of the outer gas spring piston rod to the outer bracket is shortened to reduce the distance over which the lift assist mechanism is operative. It will also be evident that, if it were only desired to provide assistance in lifting the roll bar to an elevation of approximately 6 feet, the length of the housing 66 could be shortened and the upper bracket 58 moved inwardly approximately 6 inches along the outer support arm 24o so that the free end of the outer piston rod would become disengaged with the upper bracket at the time the roll bar was elevated to approximately 6 feet. In other words, depending on the elevation of the roll bar to which assistance from the lift assist mechanism is desired, the mechanism 12 can be altered in accordance with one of the three embodiments described. If assistance is desired in lifting the roll bar to approximately 6½ feet, by way of example, the compression spring 70 can be provided to extend the overall length of the assistance, but if assistance were only desired to a lower elevation of approximately 6 feet, a nor-compressible block could be put in the housing to replace the compression spring or the housing 66 could be shortened and the upper bracket 58 moved closer to the lower bracket 50 so that the free end of the outer piston rod 44 was engageable directly with the upper bracket.

It will be appreciated from the description of the lift assist mechanism of the present invention that a prevalent problem with relatively heavy retractable awnings has been overcome. The lift assist mechanism has been designed to provide most of the force necessary to lift the awning to a desired orientation, and by designing the lift assisting force appropriately, the force provided by the mechanism is slightly less than what is truly required to lift the awning so that the lifting movement can be accomplished with very minimal effort by an operator and in a controlled manner.

Although the present invention has been described with a certain degree of particularity, it is understood that the present disclosure has been made by way of example, and changes in detail or structure may be made without departing from the spirit of the invention, as defined in the appended claims.

We claim:

1. In a retractable awning for attachment to the side of a recreational vehicle or the like wherein said awning includes an awning sheet secured along one edge to said side, an opposite edge of the awning sheet secured to a roll bar about which the awning sheet can be wrapped, a pair of support arms including first and second slidably related members pivotally connected to said side at one end and to the roll bar at the opposite end, and a pair of rafter arms operably securable at an outer end to said roll bar and secured at an inner end to said side at a location above the connection of said support arms to the side, wherein the improvement comprises a mechanism to assist relative sliding movement of said first and second members of at least one of said support arms, said mechanism comprising:

a pair of gas springs, each including a cylinder, a piston and a piston rod connected to said piston, said piston rod retractably protruding from a first end of said cylinder, said cylinders including pressurized fluid operatively associated with said pistons to bias the piston rods outwardly relative to said cylinders, connector means for operatively interconnecting the opposite ends of said cylinders to each other in axial alignment so that the piston rods project in opposite directions, each piston rod having a free end, fixed abutment means on each of said first and second members, the free end of one piston rod being operatively engaged with the abutment means on the first of said members and the free end of the other of said piston rods being operatively engageable with the abutment means on the second of said members such that when said free ends of the piston rods are not fully extended and are engaged with the associated abutment means, the members are slidably biased.

2. In the retractable awning of claim 1 wherein the free end of said one piston rod is secured to the associated abutment means.

3. In the retractable awning of claim 2 wherein the free end of the other of said piston rods is selectively engageable with the associated abutment means.

4. In the retractable awning of claim 2 further including a housing substantially surrounding said cylinders and being operatively connected to said second member, said housing being tubular in configuration and having a closed end adjacent to said other of said piston rods, said closed end defining said abutment means on the other of said members.

5. In the retractable awning of claim 4 further including a compression spring in said housing between the free end of said other piston rod and the closed end of said housing.

6. In the retractable awning of claim 4 further including a non-compressible block in said housing between the free end of said other piston rod and the closed end of said housing.

* * * * *

UNITED STATES PATENT AND TRADEMARK OFFICE
CERTIFICATE OF CORRECTION

PATENT NO. : 5,148,848
DATED : SEP. 22, 1992
INVENTOR(S) : BRENT W. MURRAY, Longmont; THOMAS G. FALUDY, Westminster, both of Colo.

It is certified that error appears in the above—identified patent and that said Letters Patent is hereby corrected as shown below:

Column 2, line 50: "--sion support arms.--" should read -- sion of the support arms. --

Column 2, line 51: "--Fig. 5 a fragmentary--" should read -- Fig. 5 is a fragmentary --

Column 2, line 52: "--with awning--" should read -- with the awning --

Column 3, line 20: "--sc that,--" should read -- so that --

Column 4, line 63: "--of outer--" should read -- of the outer --

Column 6, line 50: "--$s--" should read -- 58 --

Column 7, line 2: "--nor-compressible--" should read -- non-compressible --

Signed and Sealed this

Fourteenth Day of September, 1993

Attest:

BRUCE LEHMAN

Attesting Officer

Commissioner of Patents and Trademarks